US008674877B1

(12) United States Patent
Mateski et al.

(10) Patent No.: US 8,674,877 B1
(45) Date of Patent: Mar. 18, 2014

(54) DISTRIBUTION OF POSITIONING SATELLITE INFORMATION

(75) Inventors: Christopher J. Mateski, Overland Park, KS (US); Suryanarayanan Ramamurthy, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 453 days.

(21) Appl. No.: 13/039,414

(22) Filed: Mar. 3, 2011

(51) Int. Cl.
*G01S 19/05* (2010.01)

(52) U.S. Cl.
CPC ..................................... *G01S 19/05* (2013.01)
USPC .................................................... 342/357.42

(58) Field of Classification Search
CPC ..................................................... G01S 19/05
USPC ..................................................... 342/357.42
See application file for complete search history.

(56) References Cited

U.S. PATENT DOCUMENTS

| | | | |
|---|---|---|---|
| 5,717,404 A | 2/1998 | Malla | |
| 6,313,787 B1 | 11/2001 | King et al. | |
| 6,587,789 B2 | 7/2003 | van Diggelen | |
| 6,788,249 B1 | 9/2004 | Farmer et al. | |
| 6,842,620 B2 | 1/2005 | Smith et al. | |
| 6,861,980 B1 * | 3/2005 | Rowitch et al. | 342/357.31 |
| 7,149,534 B2 * | 12/2006 | Bloebaum et al. | 455/456.6 |
| 7,477,903 B2 | 1/2009 | Wilcock et al. | |
| 7,609,203 B2 | 10/2009 | Dockemeyer, Jr. et al. | |
| 7,633,438 B2 | 12/2009 | Tysowski | |
| 2004/0198449 A1 * | 10/2004 | Forrester et al. | 455/561 |
| 2005/0052318 A1 * | 3/2005 | Jendbro et al. | 342/357.1 |
| 2005/0197767 A1 | 9/2005 | Nortrup | |
| 2006/0106530 A1 | 5/2006 | Horvitz et al. | |
| 2006/0187017 A1 | 8/2006 | Kulesz et al. | |
| 2007/0061155 A1 | 3/2007 | Ji et al. | |
| 2007/0159388 A1 * | 7/2007 | Allison et al. | 342/357.09 |
| 2007/0159391 A1 | 7/2007 | Kuo et al. | |
| 2009/0231192 A1 | 9/2009 | van Diggelen et al. | |

OTHER PUBLICATIONS

U.S. Appl. No. 11/763,709, filed Jun. 15, 2007.
Federal Highway Administration Office of Travel Management; "Guidance on Including ITS Elements in Transportation Projects;" Jan. 2001; 21 pages.

* cited by examiner

*Primary Examiner* — Gregory C Issing

(57) ABSTRACT

A wireless communication device transmits a position assistance request. A system database receives and processes the position assistance request to determine a time of the request and a location of the wireless communication device and processes the time and the location to determine if the system database stores positioning satellite information for the time and the location. The system database transfers the positioning satellite information to the wireless communication device if the positioning satellite information is for the time and the location. The system database transfers the position assistance request to a position determining entity if the system database does not store the positioning satellite information for the time and the location.

20 Claims, 5 Drawing Sheets

DISTRIBUTION OF POSITIONING SATELLITE INFORMATION

TECHNICAL BACKGROUND

There are many different methods for determining the specific location of a wireless communication device being used within a wireless communication system. These methods may be categorized as network-based, device-based, or hybrid. Hybrid methods utilize features of both network-based and device-based methods. The categories indicate where the primary steps of the location determination processes are accomplished. In hybrid and device-based methods, some of the processing steps necessary to determine the location are performed in the wireless communication device.

Some examples of hybrid and device-based location determination methods make use of Global Positioning System (GPS) satellite signals. In these methods, the device receives signals from GPS satellites and uses those signals to calculate the location of the device. In device-based GPS methods, the device receives the GPS signals and performs the GPS location calculation with no assistance from the network. In hybrid GPS methods, the device receives some information from the network to assist with the location determination process.

One example of a hybrid method is the Assisted GPS (A-GPS) method. In the A-GPS method, the device receives information regarding expected GPS satellite positions from the wireless communication network. The information provided by the network assists the device in acquiring the GPS satellite signals. This assistance reduces the complexity of the computational process which the device must perform to determine the location and often reduces the time necessary to complete the location computations.

OVERVIEW

A wireless communication device transmits a position assistance request. A system database receives and processes the position assistance request to determine a time of the request and a location of the wireless communication device and processes the time and the location to determine if the system database stores positioning satellite information for the time and the location. The system database transfers the positioning satellite information to the wireless communication device if the positioning satellite information is for the time and the location. The system database transfers the position assistance request to a position determining entity if the system database does not store the positioning satellite information for the time and the location.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
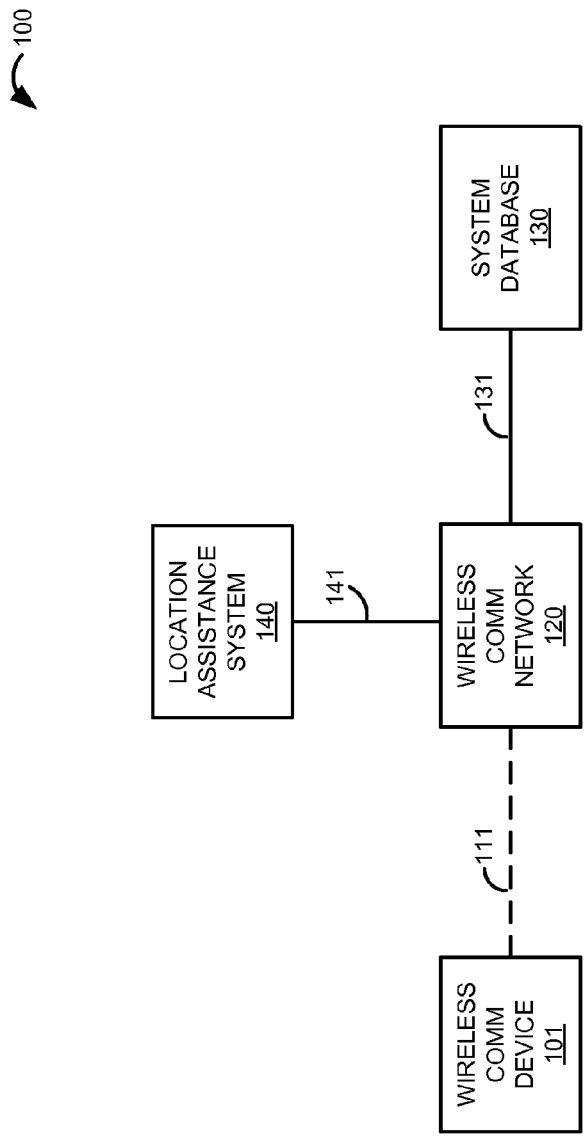
FIG. 1 illustrates a wireless communication system.

FIG. 1 illustrates wireless communication system 100. Wireless communication system 100 includes wireless communication device 101, wireless communication network 120, system database 130, and location assistance system 140. Wireless communication device 101 and wireless communication network 120 are in communication over wireless communication link 111. Wireless communication network 120 and system database 130 communicate over communication link 131. Wireless communication network 120 and location assistance system 140 communicate over communication link 141.

Figure 2:
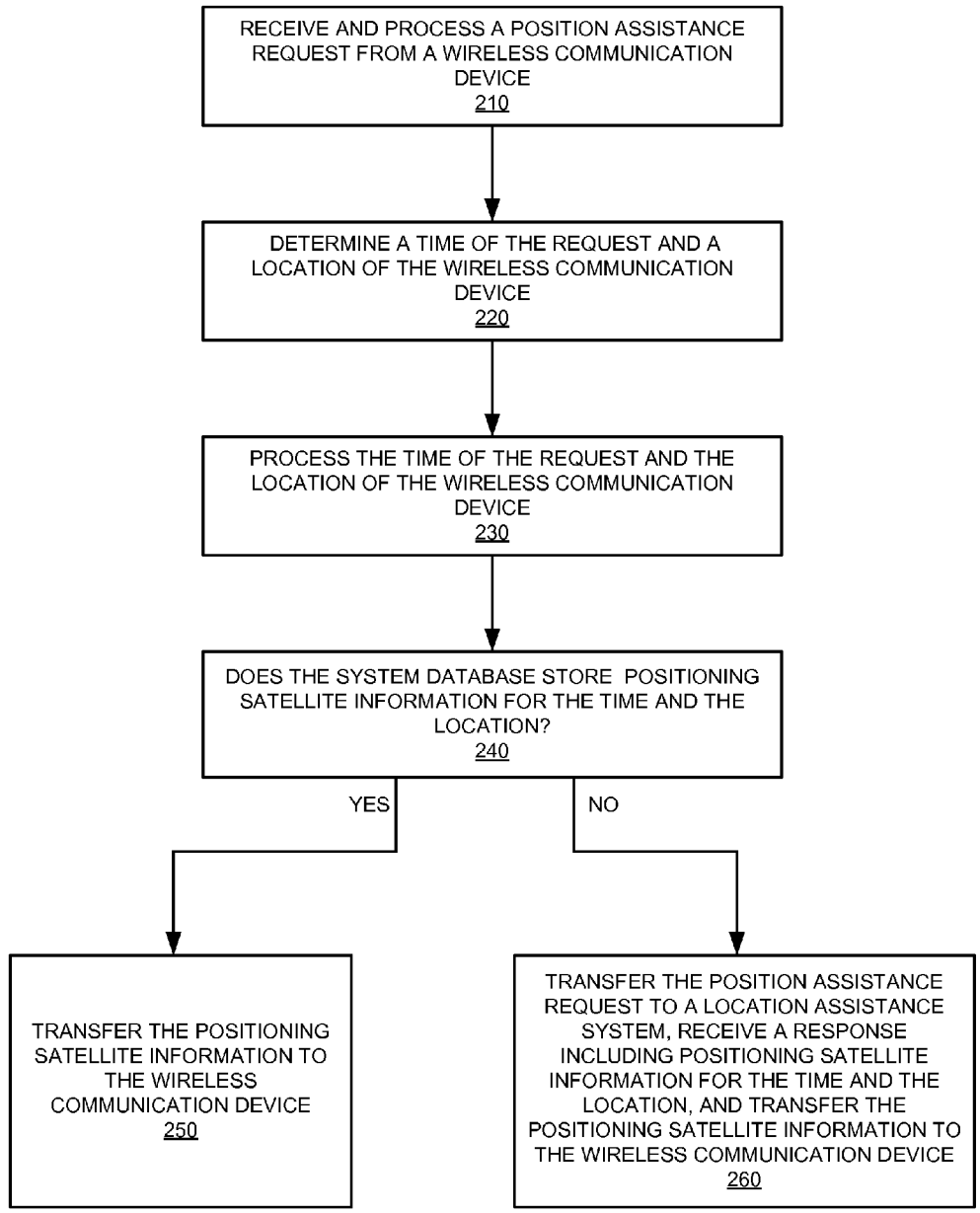
FIG. 2 illustrates an operation of a wireless communication system.

FIG. 2 illustrates an operation of communication system 100. The steps of the operation are indicated below parenthetically. System database 130 receives and processes a position assistance request from wireless communication device 101 through wireless communication network 120 (210). System database 130 determines a time of the request and a location of wireless communication device 101 (220). System database 130 then processes the time of the request and the location of wireless communication device 101 (230) and determines if system database 130 stores positioning satellite information for the time and the location (240).

If system database 130 stores the positioning satellite information for the time and the location, then system database 130 transfers the positioning satellite information for delivery to wireless communication device 101 (250). If system database 130 does not store the positioning satellite information for the time and the location, then system database 130 transfers the position assistance request for delivery to location assistance system 140. System database 130 receives a response including the positioning satellite information for the time and the location, and transfers the positioning satellite information for delivery to wireless communication device 101 (260).

Referring back to FIG. 1, wireless communication device 101 could comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus, including combinations thereof. Wireless network protocols that may be utilized by wireless communication device 101 include Code Division Multiple Access 1xRTT (CDMA), Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless communication network 120.

Wireless communication network 120 comprises the core network of a wireless communication provider, and could include RF communication circuitry, antennas, routers, gateways, telecommunication switches, servers, computer systems, processing systems, or other communication equipment and systems for providing communication and data services, including combinations thereof. Wireless communication network 120 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems, including combinations thereof.

Wireless communication network 120 may be configured to communicate over metallic, wireless, or optical links. Wireless communication network 120 may be configured to use time-division multiplexing (TDM), Internet Protocol (IP), Ethernet, optical networking, wireless protocols, communication signaling, or some other communication format, including combinations thereof. In some examples, wireless communication network 120 includes further access nodes and associated equipment for providing communication services to many wireless communication devices across a large geographic region.

System database 130 comprises a processing system and a network communication interface. System database 130 may also include other components such as a memory system, computing components, circuitry, router, power supply, and structural components. System database 130 may reside in a single device or may be distributed across multiple devices. System database 130 may be a discrete system or may be integrated within other systems, including other systems within wireless communication network 120 or wireless communication system 100. In some examples, system database 130 could be implemented in the form of a server, data distribution system, or some type of computing platform, including combinations thereof.

Wireless communication link 111 uses the air or space as the transport medium. Wireless communication link 111 may use various protocols, such as CDMA, GSM, UMTS, HSPA, EV-DO, EV-DO rev. A, 3GPP LTE, WiMAX, Wi-Fi, Bluetooth, Internet, telephony, or some other communication format, including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions, including combinations thereof.

Communication links 131 and 141 use metal, air, space, optical fiber such as glass or plastic, or some other material as the transport medium, including combinations thereof. Communication links 131 and 141 could use various communication protocols, such as TDM, IP, Ethernet, telephony, optical networking, hybrid fiber coax (HFC), communication signaling, wireless protocols, or some other communication format, including combinations thereof. Communication links 131 and 141 may be direct links or could include intermediate networks, systems, or devices.

Figure 3:
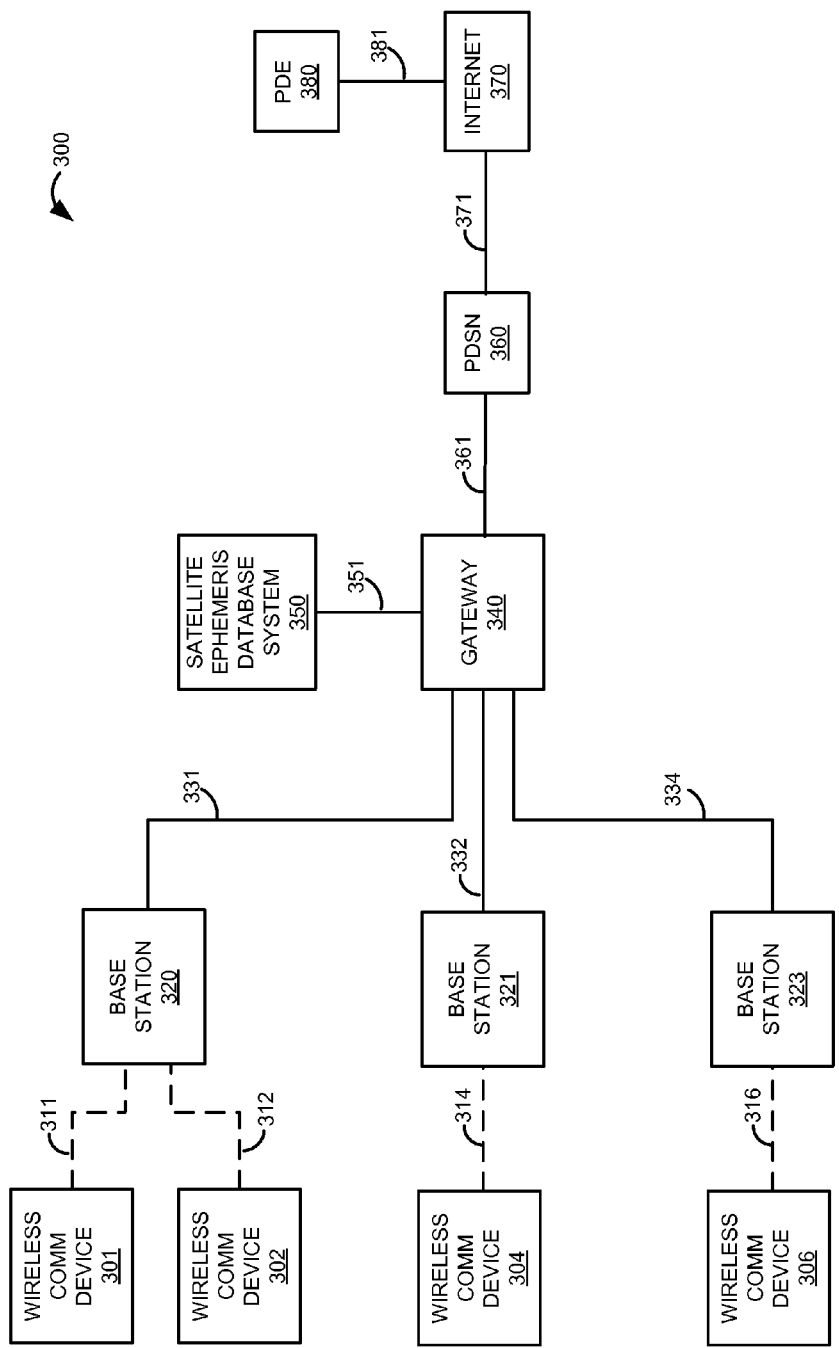
FIG. 3 illustrates a wireless communication system utilizing a database for storing satellite ephemeris data.

FIG. 3 illustrates wireless communication system 300 which utilizes a database system for storing satellite ephemeris data. Wireless communication system 300 is an example of wireless communication system 100, although wireless communication system 100 may use an alternate configuration or operate in an alternate manner. Wireless communication system 300 comprises wireless communication devices 301-306, base stations 320-323, gateway 340, satellite ephemeris database system 350, packet data serving node (PDSN) 360, Internet 370, and position determining entity (PDE) 380.

Gateway 340 and base stations 320-323 function together to provide wireless communication services to wireless communication devices 301-306. In combination, gateway 340 and base stations 320-323 perform functions similar to those of wireless communication network 120, although wireless communication network 120 may have additional components, use an alternate configuration, or operate in an alternate manner. PDE 380 is an example of location assistance system 140 although location assistance system 140 may use an alternate configuration or operate in an alternate manner.

Satellite ephemeris database system 350 is an example of system database 130 although system database 130 may use an alternate configuration or operate in an alternate manner. Satellite ephemeris database system 350 is illustrated in FIG. 3 and discussed in the examples which follow as a database system for satellite ephemeris data. However, the methods and systems described in these examples would operate similarly using other types of positioning satellite data. It should be understood that the examples which follow also teach the use of these methods and systems using other types of positioning satellite data.

The wireless communication services provided by wireless communication system 300, gateway 340 and base stations 320-323 may involve voice services, data services, and other types of requests and information exchanges. In some situations, it may be desirable or necessary to establish the specific location of one or more of the wireless communication devices. A wireless communication system may use multiple different methods to determine the location of the wireless communication device. In some of those methods, positioning satellite information is provided to the wireless communication device in order to aid the device's computation of its own position.

In order to establish its own location, wireless communication device 302, for example, may make a position assistance request through for position assistance information. The position assistance request may be related to a request for emergency services, in response to a request from an application running on wireless communication device 302, or for other reasons.

In one example, wireless communication device 302 requests GPS satellite ephemeris data related to its location and completes the location calculations using the received data. Wireless communication device 302 may make the request for this type of data in the form of an IS-801 Type C message. Typically, PDE 380 responds by providing the satellite ephemeris data based on the approximate location of wireless communication device 302. Wireless communication device 302 uses the received data to aid in the location of GPS satellites. With the assistance of the ephemeris data, wireless communication device 302 completes the GPS-based location determination process and calculates its own location.

In the example above, each position assistance request from a wireless communication device in wireless communication system 300 is transferred to PDE 380. PDE 380 must process the request, determine the appropriate ephemeris data, and respond to the request with the data. Because there may be many requests from many wireless communication devices in wireless communication system 300 and because PDE 380 may provide services to additional wireless communication systems, PDE 380 may become busy or overloaded.

Figure 4:
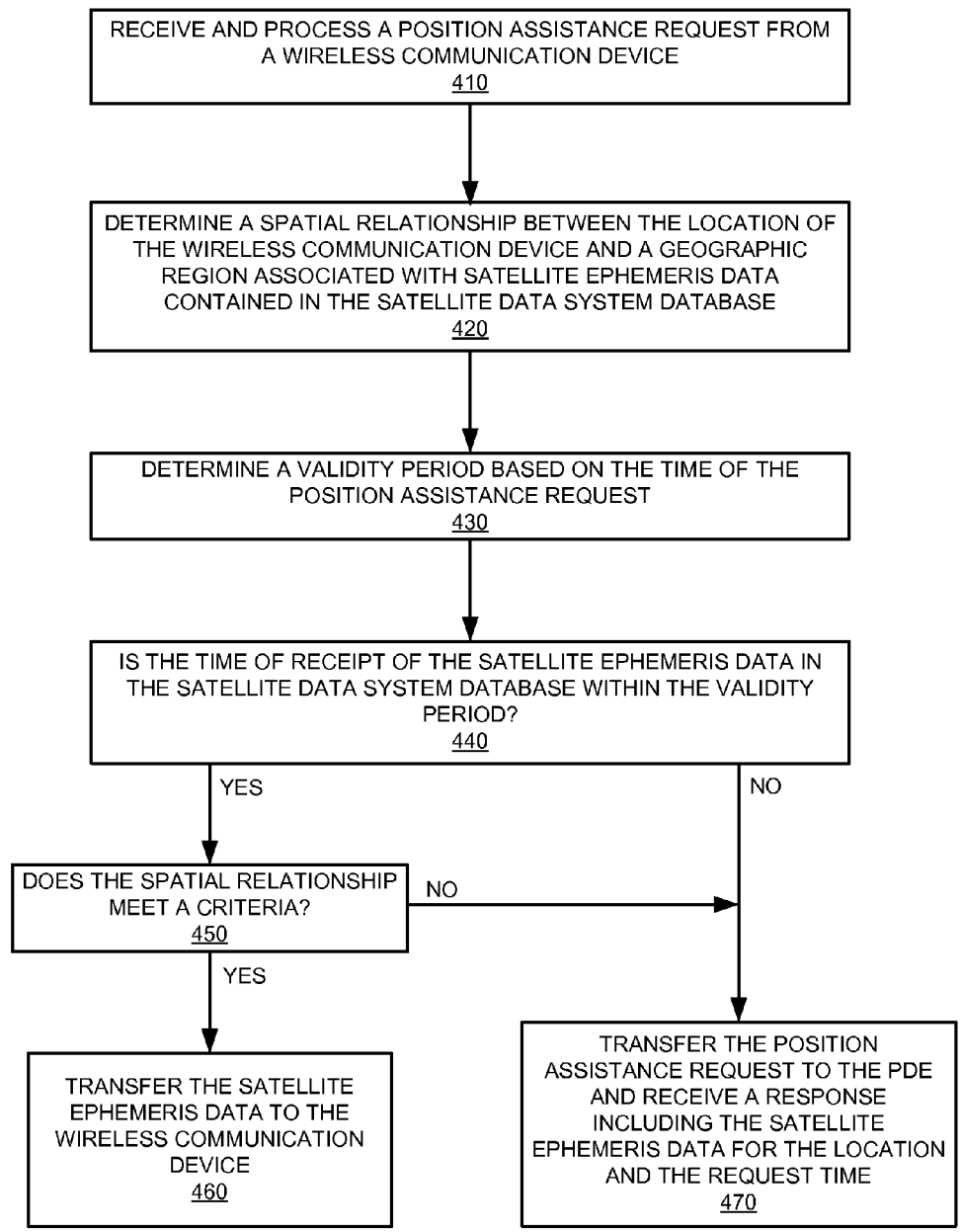
FIG. 4 illustrates an operation of a wireless communication system utilizing a database for storing satellite ephemeris data.

FIG. 4 illustrates one example of operation of communication system 300 which advantageously reduces the loading on PDE 380 discussed above. The steps of the operation are indicated parenthetically. Satellite ephemeris database system 350 receives and processes a position assistance request from wireless communication device 302 through base station 320 and gateway 340 (410). Satellite ephemeris database system 350 then determines a spatial relationship between the location of wireless communication device 302 and a geographic region associated with satellite ephemeris data contained in satellite ephemeris database system 350 (420). Satellite ephemeris database system 350 also determines a validity period based on the position assistance request time (430).

If the time of receipt of the satellite ephemeris data in satellite ephemeris database system 350 is within the validity period and the spatial relationship meets a criteria, then satellite ephemeris database system 350 transfers the satellite ephemeris data for delivery to wireless communication device 302 (450, 460). If the time of receipt of the satellite ephemeris data is not within the validity period or the spatial relationship does not meet the criteria, then satellite ephemeris database system 350 transfers the position assistance request to PDE 380 through PDSN 360 and Internet 370 (470). Satellite ephemeris database system 350 receives a response from the PDE including the satellite ephemeris data for the location and the position assistance request time.

In one example of operation of wireless communication system 300, satellite ephemeris database system 350 stores satellite ephemeris data from previous requests. The stored data may satisfy the request from the wireless communication device and satellite ephemeris database system 350 may provide that data in response to the position assistance request. In that case, the position assistance request is not transmitted to PDE 380. Satellite ephemeris data stored in satellite ephemeris database system 350 may only be able to satisfy the request if it meets location and time requirements. The satellite ephemeris data can only be used to satisfy the request from wireless communication device 302 if it was originally generated for a location which is near the location of wireless communication device 302 and only if the data is not too old.

Satellite ephemeris database system 350 determines the suitability of responding to the request using stored satellite ephemeris data from previous requests by determining a spatial relationship between the location of wireless communication device 302 and a geographic region associated with the stored satellite ephemeris data. If the original location for which the ephemeris data was generated and the location for which wireless communication device 302 is requesting ephemeris data are sufficiently close, the stored ephemeris data may be sufficiently accurate for use in responding to the request.

The stored ephemeris data must also not be too old in order to be valid for use in responding the position assistance request from wireless communication device 302. The ephemeris data is only valid for a certain period of time after it is generated. It becomes gradually more inaccurate and less useful over time. The period of time in which the ephemeris data may potentially be reused is the validity period. When a request is received, satellite ephemeris database system 350 determines if the time of the request from wireless communication device 302 is within the validity period of stored ephemeris data.

If satellite ephemeris database system 350 contains ephemeris data which is still within the validity period and there is a sufficiently close spatial relationship between the location for which the ephemeris data was originally generated and the location of the request, satellite ephemeris database system 350 send the ephemeris data to wireless communication device 302 in response to the request. In this case, the request is satisfied without forwarding the request to or waiting for a response from PDE 380.

If the ephemeris data in satellite ephemeris database system 350 is not within the validity period or does not have a sufficiently close spatial relationship to the location of the request, satellite ephemeris database system 350 transfers the position assistance request to PDE 380 through PDSN 360 and Internet 370. PDE 380 then transmits a response including current ephemeris data for the location associated with the request. In addition to being sent to wireless communication device 302, this new ephemeris data is stored in satellite ephemeris database system 350 to potentially be used to respond to future location assistance requests.

In the examples above, the determination regarding whether the stored ephemeris data can be used to respond to a current location assistance request from a device, is based upon the relationship between the time and location of the current request and the time and location for which the stored ephemeris data was originally generated. As the differences between the times and locations become greater, the inaccuracies associated with using the stored ephemeris data also become larger. However, using stored ephemeris data which produces slightly inaccurate results may still be preferred if PDE 380 is unavailable, is congested and slow to respond, or cannot be accessed for other reasons. Therefore, it may be useful to vary the thresholds which specify acceptable differences in time or location between the request and the stored data. These thresholds may be varied based on factors such as loading, availability, network conditions, cost, level of service, or other factors.

In one example, satellite ephemeris database system 350 monitors the loading of PDE 380. If PDE 380 is heavily loaded, congested, or response times from PDE 380 are long for some other reason, satellite ephemeris database system 350 extends the validity period of the stored ephemeris data. In other words, stored ephemeris data which may have been deemed to be too old under normal circumstances may be used to respond to a request from a device when PDE 380 is heavily loaded. Any additional inaccuracy which results from using slightly older ephemeris data may be outweighed by the delays associated with waiting for a response including updated ephemeris data from PDE 380. The validity period or expiration time of stored ephemeris data may be dynamically adjusted as the loading of PDE 380 changes in order to balance the tradeoff between using older data and delayed PDE responses.

In a similar manner, the criteria which must be satisfied by the spatial relationship between the request and the stored ephemeris data may be adjusted based on loading or availability of PDE 380. If PDE 380 is available and not heavily loaded, stored ephemeris data may only be used to respond to a request if the location of the device making the request is sufficiently close the location of the stored data or within a geographic region associated with the stored data. However, if PDE 380 is heavily loaded or unavailable, the spatial relationship between the locations required to satisfy the criteria may be relaxed. In this case, even though the spatial relationship between the locations is not sufficiently close to justify use of the stored ephemeris data under normal circumstances; the relationship may still be close enough to justify its use relative to the resulting additional wait time if the request is forwarded to PDE 380.

A specific geographic region may be associated with stored ephemeris data. Under normal circumstances, only location assistance requests from within this geographic region will be sufficient to satisfy the spatial relationship criteria necessary for use of the stored ephemeris data. In circumstances where PDE 380 is heavily loaded or unavailable for other reasons, it may still be advantageous to respond to requests using stored ephemeris data where the location associated with the request is within a buffer distance of the geographic region associated with the stored data. Using the stored ephemeris data under these circumstances may result in some inaccuracy but the drawbacks of this inaccuracy may be outweighed by the delays which would result from sending the request to and waiting for a response from PDE 380. The size of the buffer distance may be dynamically adjusted based on the loading or availability of PDE 380.

Figure 5:
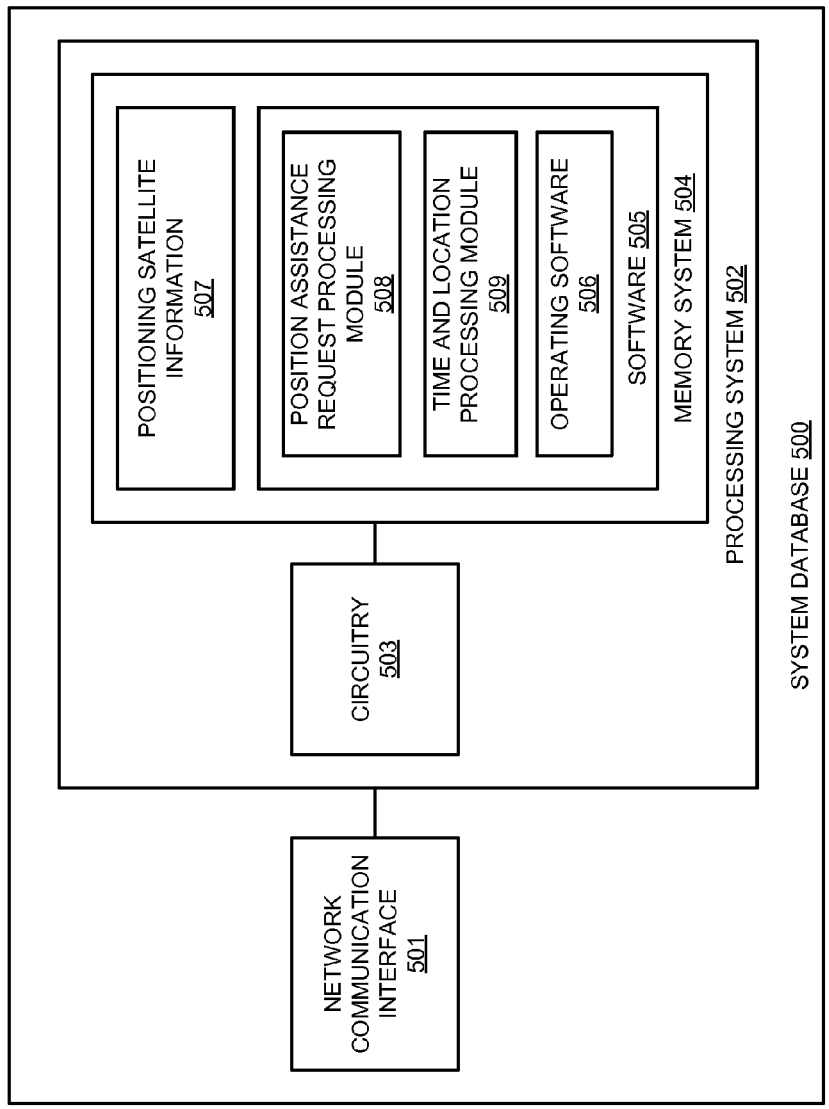
FIG. 5 illustrates a system database.

FIG. 5 illustrates system database 500. System database 500 is an example of satellite ephemeris database system 350 and system database 130 although satellite ephemeris database system 350 and system database 130 may use alternate configurations or operate in alternate manners. System database 500 comprises network communication interface 501 and processing system 502.

Network communication interface 501 comprises components that communicate over communication links, such as network cards, ports, RF transceivers, processing circuitry and software, or some other communication components. Network communication interface 501 may be configured to communicate over metallic, wireless, or optical links. Network communication interface 501 may be configured to use TDM, IP, Ethernet, optical networking, wireless protocols, communication signaling, or some other communication format, including combinations thereof. Network communication interface 501 receives position assistance requests from wireless communication devices and transfers positioning satellite information for delivery to wireless communication devices.

Processing system 502 comprises circuitry 503 and memory system 504. Circuitry 503 comprises microprocessor and other circuitry that retrieves and executes operating software 506 from memory system 504. Memory system 504 comprises software 505 and positioning satellite information 507. Memory system 504 may be a disk drive, flash drive, data storage circuitry, or some other non-transitory storage medium.

Software 505 comprises operating software 506, position assistance request processing module 508, and time and location processing module 509. However, software 505 could have alternative configurations and may contain additional modules or functions in some examples.

Operating software 506 comprises computer programs, firmware, or some other form of machine-readable processing instructions. Operating software 506 may include an operating system, utilities, drivers, network interfaces, applications, or some other type of software. Positioning satellite information 507 comprises GPS satellite ephemeris data, GPS satellite almanac data, or other types of data regarding the positions of satellites used for location determination purposes.

When executed by circuitry 503, operating software 506 directs processing system 502 to operate system database 500 as described herein. In particular, operating software 506 may direct position assistance request processing module 508 to receive position assistance requests from a wireless communication device through network communication interface 501 and determine a time of the request and a location of the wireless communication device. In addition, operating software 506 may direct time and location processing module 509 to process the time of the request and the location of the wireless communication device to determine if the positioning satellite information 507 contains positioning satellite information for the time and location.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system comprising:
    receiving and processing a position assistance request from a wireless communication device to determine a time of the request and a location of the wireless communication device;
    processing the time of the request and the location of the wireless communication device to determine if a wireless communication system database stores positioning satellite information for the time and the location after having received the positioning satellite information from a location assistance system in response to a previous position assistance request;
    if the wireless communication system database stores the positioning satellite information for the time and the location, then transferring the positioning satellite information for delivery to the wireless communication device; and
    if the wireless communication system database does not store the positioning satellite information for the time and the location, then transferring the position assistance request for delivery to the location assistance system, receiving a response including the positioning satellite information for the time and the location, and transferring the positioning satellite information for delivery to the wireless communication device.

2. The method of claim 1 wherein the positioning satellite information comprises Global Positioning System (GPS) satellite ephemeris data.

3. The method of claim 1 wherein the positioning satellite information comprises GPS satellite almanac data.

4. The method of claim 1 wherein the positioning satellite information is for the time when the time of the request does not exceed a time of receipt of the positioning satellite information in the wireless communication system database by more than an expiration period.

5. The method of claim 4 further comprising monitoring a loading of the location assistance system and determining the expiration period based on the loading of the location assistance system.

6. The method of claim 1 wherein the location assistance system comprises a position determining entity (PDE).

7. The method of claim 1 wherein the position assistance request comprises an IS-801 message.

8. The method of claim 1 wherein the location comprises a location of a wireless base station.

9. A method of operating a wireless communication system comprising:
- receiving and processing a position assistance request from a wireless communication device;
- determining a spatial relationship between a location of the wireless communication device and a geographic region associated with positioning satellite information contained in a wireless communication system database after having been received by the wireless communication system database from a location assistance system in response to a previous position assistance request;
- determining a validity period based on a position assistance request time;
- if a time of receipt of the positioning satellite information in the wireless communication system database is within the validity period and the spatial relationship meets a criteria, then transferring the positioning satellite information for delivery to the wireless communication device; and
- if the time of receipt of the positioning satellite information is not within the validity period or the spatial relationship does not meet the criteria, then transferring the position assistance request for delivery to the location assistance system, and receiving a response including the positioning satellite information for the location and the position assistance request time, and transferring the positioning satellite information for delivery to the wireless communication device.

10. The method of claim 9 wherein the positioning satellite information comprises GPS satellite ephemeris data.

11. The method of claim 9 wherein the location assistance system comprises a PDE.

12. The method of claim 9 wherein the position assistance request comprises an IS-801 message.

13. The method of claim 9 further comprising determining the validity period based on an availability of the location assistance system.

14. The method of claim 9 wherein the spatial relationship meets the criteria if the location of the wireless communication device is within the geographic region.

15. The method of claim 9 wherein the spatial relationship meets the criteria if the distance between the location of the wireless communication device and the geographic region is less than a buffer distance.

16. The method of claim 15 further comprising determining the buffer distance based on a loading of the location assistance system.

17. A wireless communication system comprising:
- a wireless communication device configured to transmit a position assistance request; and
- a wireless communication system database configured to receive and process the position assistance request to determine a time of the request and a location of the wireless communication device, process the time and the location to determine if the wireless communication system database stores positioning satellite information for the time and the location after having received the positioning satellite information from a PDE in response to a previous position assistance request, transfer the positioning satellite information for delivery to the wireless communication device if the positioning satellite information is for the time and the location, and transfer the position assistance request for delivery to the PDE if the wireless communication system database does not store the positioning satellite information for the time and the location.

18. The wireless communication system of claim 17 wherein the positioning satellite information comprises GPS satellite ephemeris data.

19. The wireless communication system of claim 17 wherein the positioning satellite information is for the time when the time of the request does not exceed a time of receipt of the positioning satellite information in the wireless communication system database by more than a validity window.

20. The wireless communication system of claim 19 wherein the validity window is determined based on a loading of the PDE.

* * * * *